United States Patent [19]
Steinhoff et al.

[11] Patent Number: 6,088,240
[45] Date of Patent: Jul. 11, 2000

[54] HINGED FLIP ASSEMBLY FOR A COMMUNICATION DEVICE

[75] Inventors: William S. Steinhoff, Sunrise; William A. Gilbert, Weston; Aaron M. Schuelke, Sunrise, all of Fla.

[73] Assignee: Motorola, Inc., Schaumburg, Ill.

[21] Appl. No.: 09/094,865

[22] Filed: Jun. 15, 1998

[51] Int. Cl.$^7$ .............................. H04B 1/03; H04M 1/03
[52] U.S. Cl. ..................... 361/814; 439/165; 455/90; 379/433
[58] Field of Search ................... 361/814; 455/89, 455/90, 347, 350, 351; 439/164, 165; 379/431, 432, 433, 58

[56] References Cited

U.S. PATENT DOCUMENTS

| | | |
|---|---|---|
| 4,897,873 | 1/1990 | Beutler et al. ................... 379/433 |
| 5,175,759 | 12/1992 | Metroka et al. . |
| 5,276,916 | 1/1994 | Pawlish et al. ..................... 455/89 |
| 5,278,993 | 1/1994 | Reiff et al. . |
| 5,316,168 | 5/1994 | Finch et al. . |
| 5,673,314 | 9/1997 | Olkoski et al. . |

*Primary Examiner*—Jayprakash N. Gandhi
*Attorney, Agent, or Firm*—M. Mansour Ghomeshi

[57] ABSTRACT

A hinged flip assembly includes a door cover (120) having a chamber (214) and a hub (122) for rotating along a hinge mechanism (133). A transducer (206) is disposed in the chamber (214). At least one wire (202) is coupled (222) through the hub (122) of the door cover (120) for connecting to the transducer (206). A wire connector (204) terminating the at least one wire (202) and the wire connector (204) is also coupled (222) through the hub (122).

9 Claims, 5 Drawing Sheets

HINGED FLIP ASSEMBLY FOR A COMMUNICATION DEVICE

CROSS-REFERENCE

This application is related to a co-pending United States patent application Ser. No. 09/097,577 filed Jun. 15, 1998, filed concurrently herewith assigned to Motorola, Inc.

TECHNICAL FIELD

This invention relates in general to door cover assemblies, and in particular, to door cover assemblies used on electronic devices.

BACKGROUND

Door cover assemblies used to cover the controls on electronic devices have become popular in recent years. Increasingly seen on personal hand-held communication devices, such as a cellular or mobile radio telephone, a two-way radio, a pager, or any such combination, the door covers serve to protect electronic controls from accidental engagement, and also often serve to provide a smaller and more attractive electronic device package with increasing functions. Such a folding arrangement allows these devices to be more compact. In some of these devices, the door, cover, flap, or flip "flips" open to activate the device, and also functions as a mouthpiece or earpiece for the user.

Conventional designs of housings having closable flaps, flips, or doors usually employ a hinge mechanism to provide a self closing feature where the flip door is attached to the main housing of a hand-held communication device. Any required electrical connections between the two halves of the hinged portions would require separate wires or flexible circuit connections that must be somehow routed, with or without a connector, around the hinge mechanism.

An important factor for door cover assembly designs is the number of factory operations or steps required to complete the assembly. If wires are attached without a connector, then the wires would have to be terminated or soldered on the assembly line as an extra step. Reducing the number of assembly steps and minimizing the number of parts used are important contributions to reducing costs and increasing efficiencies of most manufacturing operations. Assemblies which achieve these objectives are in constant demand in the art. Therefore, a new door cover assembly is required which is simpler to assemble as a hinge which contains the connector for the attached wires.

DETAILED DESCRIPTION OF THE PREFERRED EMBODIMENT

Referring to FIGS. 1–5, a communication device such as a portable two-way radio/telephone combination 100 is shown which incorporates a partially assembled hinge base 105 in a clam-shell configuration.

The partially assembled hinge base or hinged base 105 includes an inventive door cover assembly 120 already partially assembled to a housing 101. The portable radio 100 contains electronic circuitry which allows communications over a radio frequency channel. The partially assembled hinge base 105, which almost is a complete radio, except for an inventive hinge pin 133, comprises a body portion enclosed by the housing 101, and the door cover 120, commonly referred to with various names as a flip door, flip, or flap, already rotatably mounted to the housing 101 by an internal hinge mechanism on one corner 130 of the door cover 120.

The door cover 120 rotates between an open position, for a telephone operation, and a closed position, for a two-way radio operation, with respect to the housing 101 of the radio.

The open door cover switches the radio 100 "ON" in a conventional telephone operation or switches the two-way operation to a mobile telephone operation (based on the sensing of a magnet 260 disposed in the door cover), exposes radio control keys through key openings 112 for access by the user, and also serves to channel the user's voice to a selected one of a pair of radio transducers or speakers 206, depending on the operation selected. The louder speaker (not shown) is located behind a speaker grille 306 in the main housing portion 101 for use of the communication device as a conventional two-way radio where the radio is removed from the user's ears. The lower audio output transducer or speaker 206, disposed in the door cover 120 is only used when the communication device is used as a telephone with an ear-piece or ear-cup of the device 101 held close to the user's ears. When closed, the door cover 120 protects the radio control keys, protruding through the openings 112 from inadvertent engagement and switches the radio 100 "OFF" or from a telephone operation to a two-way radio operation.

Since two-way radio users prefer to make dispatch calls with the flip closed, it would be beneficial for these users to be able to view the display underneath the closed flip of this combination dispatch/phone communication device. Even for the telephone user, being able to view the display underneath while the flip is closed before opening the flip for receiving an incoming call could be desirable, such as being able to see the caller's phone number before deciding whether to receive the call or not. To actuate the keys underneath the flip to receive the call or to end it, without first opening the flip as with a conventional flip, would also be desirable.

Figure 1:
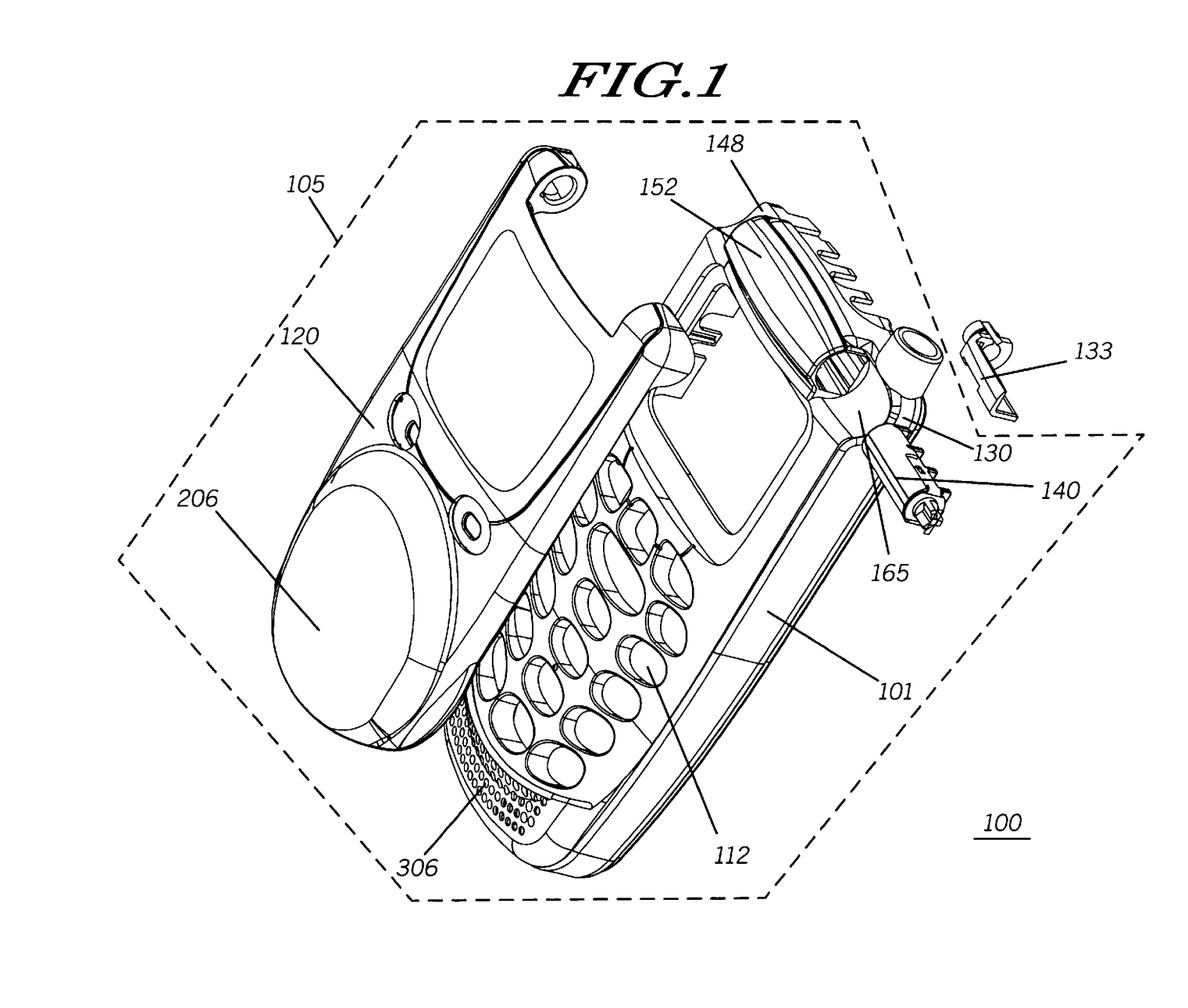
FIG. 1 is an exploded perspective front view of a door cover and hinge assembly for a communication device, showing a first embodiment of a hinge pin 133, without wires attached, in accordance with the present invention.
Figure 2:
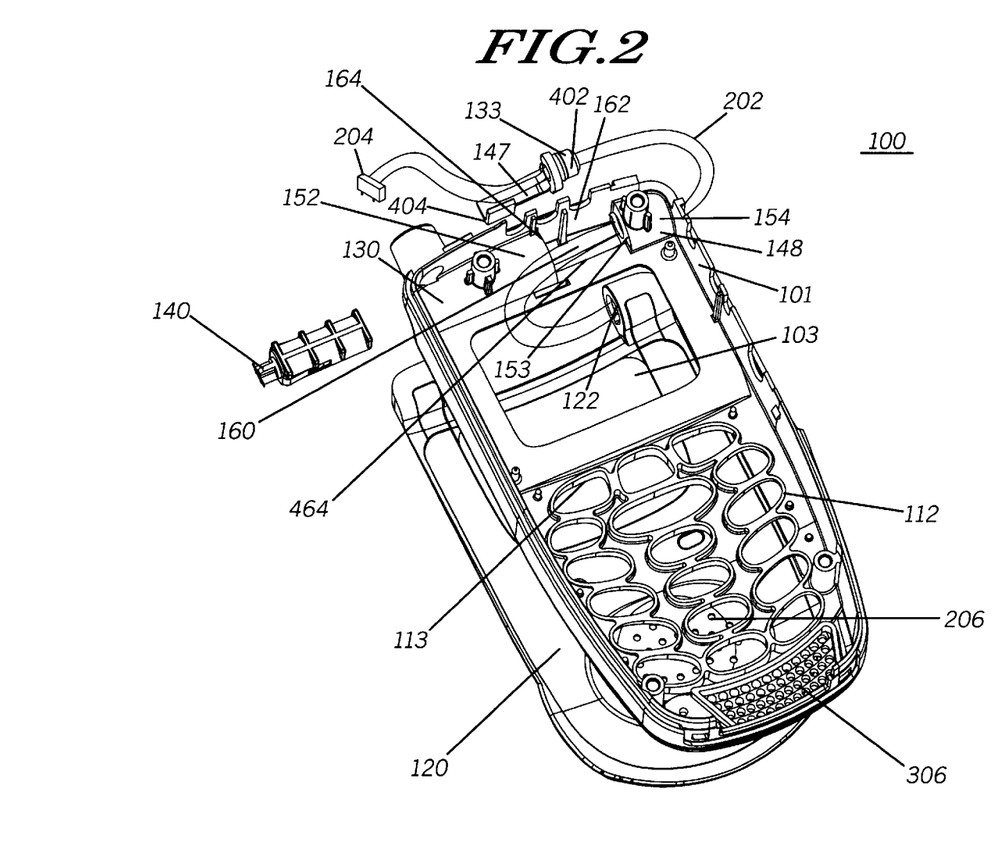
FIG. 2 is an exploded perspective back view of the door cover and hinge assembly, with the wires attached, for the communication device of FIG. 1, in accordance with the present invention.
Figure 5:
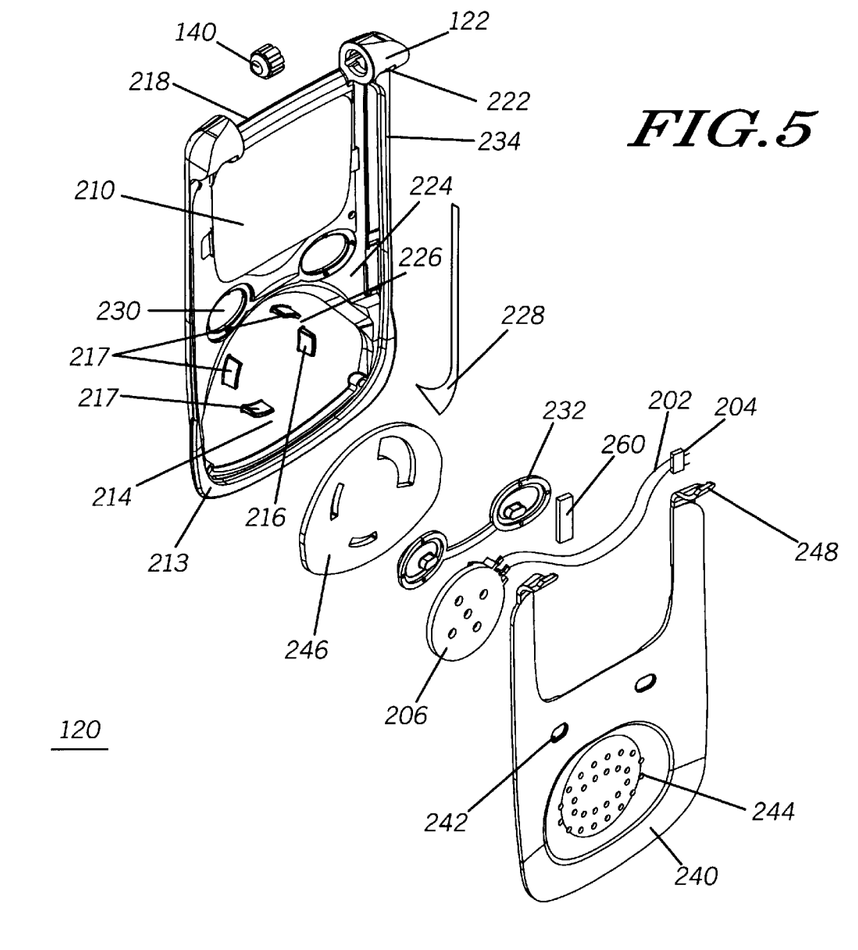
FIG. 5 is an exploded perspective view of the door cover assembly 120 of FIG. 1, in accordance with the present invention.

To fabricate such a lens 210 that is integrated with the door cover 120 for viewing a display 103 on the housing 101 underneath, the door cover is preferably made from a transparent plastic material. The integral lens area is left unpainted for see-through-viewing of this still robust flip, while the rest of the flip could be painted to match the housing of the communication device if desired. Alternatively, the lens could be a separate part that is retained and mounted within a window frame of the chassis.

However, when the lens is part of the flip, the area taken-up by the transparent flip minimizes the left-over area available for electrical and mechanical coupling of the transducer 206 in the same flip and the hinging of the flip to the housing 101 underneath.

In order to provide transducer coupling for a good audio-output and flip hinging, along with other functions, the flip is preferably ultrasonically welded or otherwise sealed from two thin slightly curved halves along the border of the lens area. A slightly larger door chassis 213 having a hub 122 and channeling elements to retain the transducer 206 and channel a pair of transducer wires 202 through the hub 122 makes-up one of the two halves. The integral lens 210 is also disposed in this chassis 213. The chassis 213 includes a protruding oval area 214, below the integral lens 210, to provide sufficient volume to form an audio chamber within the oval area 214. The channeling elements include at least two circular sidewalls 216 surrounding and retaining the transducer 206 within. However, if the transducer 206 was not round, the sidewalls 216 would be of another suitable shape to retain the transducer.

Assisting in the formation of a simulated base for the hinge mechanism, the two hubs 122 rise or otherwise protrude, as in the ends of a scroll, from a substantially flat panel on opposing ends of the top of the chassis 213. The top substantially rectangular center area 218 between the two hubs 122 is left open for mating with the housing 101 underneath. The hubs 122 are similar except that the hub 122, opposite the corner 130, has an internal opening 222 for coupling through the pair of transducer wires 202 that are terminated by the wire connector 204.

As part of the channeling elements of the chassis, a recessed groove 224 is molded on one side of the chassis 213. The groove 224 extends from a sloped side of the oval area 214, routes along a side of the lens area 210 on one of the two U-shaped legs of the chassis 213 and terminates in the internal opening 222 of the hub 122. The bottom of the "U" is the substantially flat panel of the chassis 213 that is slightly curved and shaped much like an apron or a bib with the upper parts of the "U" as the "strings" of the bib or the apron. Optionally, more circular sidewalls 217, as part of the channeling elements, could surround the transducer 206 and located such that the space 226 between two adjacent circular sidewalls permit and allow the transducer wires 202 captured in-between to be routed within the groove 224 and through the hub 122. Preferably, a layer of double-sided adhesive 228 in the shape of the groove 224 can be applied within the groove 224 for additional securing of the wires 202.

Preferably, at least one button opening 230 is cut-away or otherwise formed on the chassis 213 for mounting a corresponding actuator or flip keypad 232 for actuating a key, accessible through the key opening 113, underneath the hinged flip assembly. In this exemplary case, two button openings 230 are located and slightly recessed to retain a pair of actuators 232 connected by a rib for controlling two-way radio functions. The button openings 230 are disposed between the lens area 210 and the oval area 214 and are next to the groove 224.

A substantially U-shaped lip 234 outlining the edges of the lens area 210 and the border of the chassis 213 is slightly raised from the rest of the somewhat recessed chassis to form a mating edge with a corresponding U-shaped door lid 240 placed on top of the chassis 213, around the bottom and sides of the lens area 210. As the other one of the two thin halves of the door cover or flip, the U-shaped door lid 240 covers the chassis 213, except for the lens area 210 and includes an arrangement of apertures for mating with the door chassis 213 underneath. The arrangement of apertures includes at least one key opening 242 for protruding the actuator 232 accessible through the button opening 230. The arrangement of apertures further includes a speaker grille 244 for audio porting the transducer 206 retained underneath on the chassis 213. A front felt pad (not shown) is preferably adhesively attached behind the speaker grille so that it is disposed between the chamber formed from the oval area of the chassis and the transducer for minimizing audio leaks through the chamber. Similarly, a rear felt pad 246 may also be adhesively attached within the oval area 214 and having slots for the circular sidewalls to protrude in the chamber.

Two extended top ends 248 of the U-shaped lid 240 are slightly circularly contoured and extended to cover the openings 222 of the hubs 122. The lid may further include tiny tabs and other protrusions on the underside (not shown) for mating with corresponding receiving areas of the chassis and to aid in the ultra-sonic welding of the two halves to complete the door cover assembly.

A complete hinge assembly is insertable into the housing 101 as two opposing members, wherein a first member 140 at the corner 130 is already attached as a partially hinge base 105. The hinge pin assembly, including an inventive hinge pin 133, completes the other corner of the hinge assembly. As the foundation for the pin hinge assembly, the partially assembled hinge base 105 includes the door cover 120, a cam, spring, and hinge assembly 140, as the first hinge member, already attached on the corner 130 between the door cover 120 and the housing 101. For completing and locking-in the hinge assembly at the opposed corner, the partially assembled hinge base 105 has a receiving receptacle 148, an edge 153 of the receiving receptacle, and a socket 160 having a first wall 164 which is integral to the radio housing for mating with the hinge pin 133.

Figure 3:
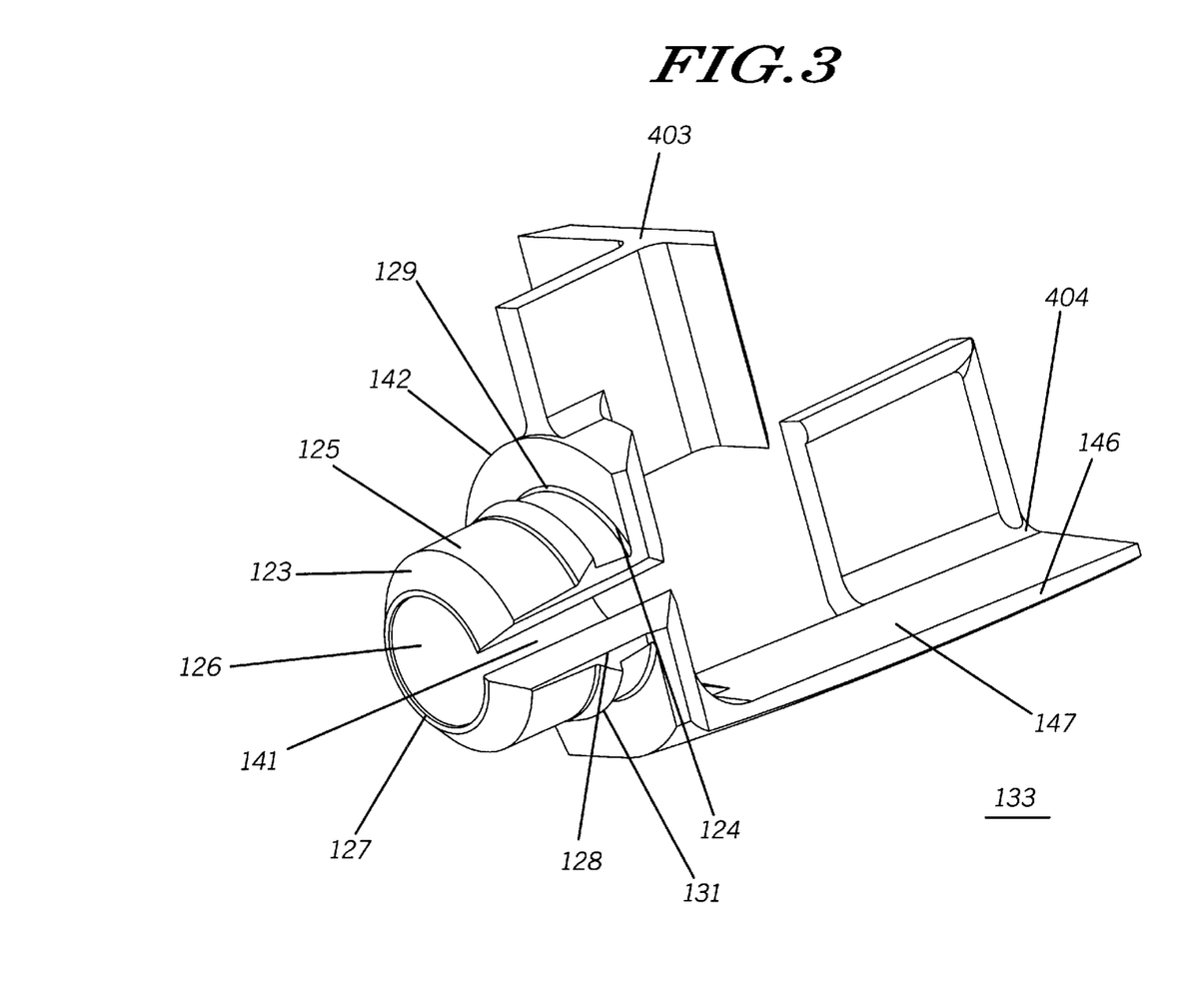
FIG. 3 is a perspective view of an alternate embodiment of the hinge pin 133 of FIG. 1, in accordance with the present invention.

As part of the hinge pin 133, a hinge body member 125, preferably in the shape of a barrel or any other suitable shapes, has a first opposed surface 123 and a second opposed surface 124 as an entry and exit of the barrel, and an aperture 126 extending from the first opposed surface 123 to the second opposed surface 124, a side 128 adjoining the first and second opposed surfaces 123 and 124 and a slot 141 cut into the side 128 extending from the first opposed surface 123 to the second opposed surface 124. A hinge ledge member 142 protrudes around the periphery of the second opposed surface and an optional hinge leg member 146 extends from the second opposed surface 124 at the ledge member 142 for allowing the body member 125 to be pressed and snapped into the receiving receptacle 148 of the partially assembled hinge base by slightly collapsing the edges (128) of the slot 141 through the receiving receptacle 148 until the ledge member 142 plugs against the edge 153 of the receiving receptacle of the partially assembled hinge base and the leg member 146 is received into the socket 160 of the partially assembled hinge base while the leg member 146 is pressed against the wall 164 of the socket.

Other variations of the hinge pin are possible, as long as the hinge body can plug-up a corresponding receptacle of the rest of the hinge base. However, in this exemplary embodiment, the hinge body member 125 is preferably in the shape of a barrel having an angled annular periphery 127 at the first opposed surface 123. The angled periphery 127 facilitates an easier insertion of the body member 125 into the receiving receptacle 148 through its edge 153. For a tighter fit between the pin and the edge 153 of the receiving receptacle, a rim 129 is preferably raised from the barrel and integrally connected to the ledge member 142 and a seam-like ridge 131 is additionally raised from the barrel. The rim 129 serves as a detent for impeding the movement of the rim 129 beyond the boundary of the edge 153 of the receiving receptacle.

Optionally, various cuts and protrusions can be made on the surface of the hinge pin 133 such that the housing 101 and flip 120 with corresponding receiving surfaces can further retain or be retained by the pin 133. For example, a slight angled protrusion or rim 129 on the surface of the barrel, around its circular barrel perimeter can be formed.

Figure 4:
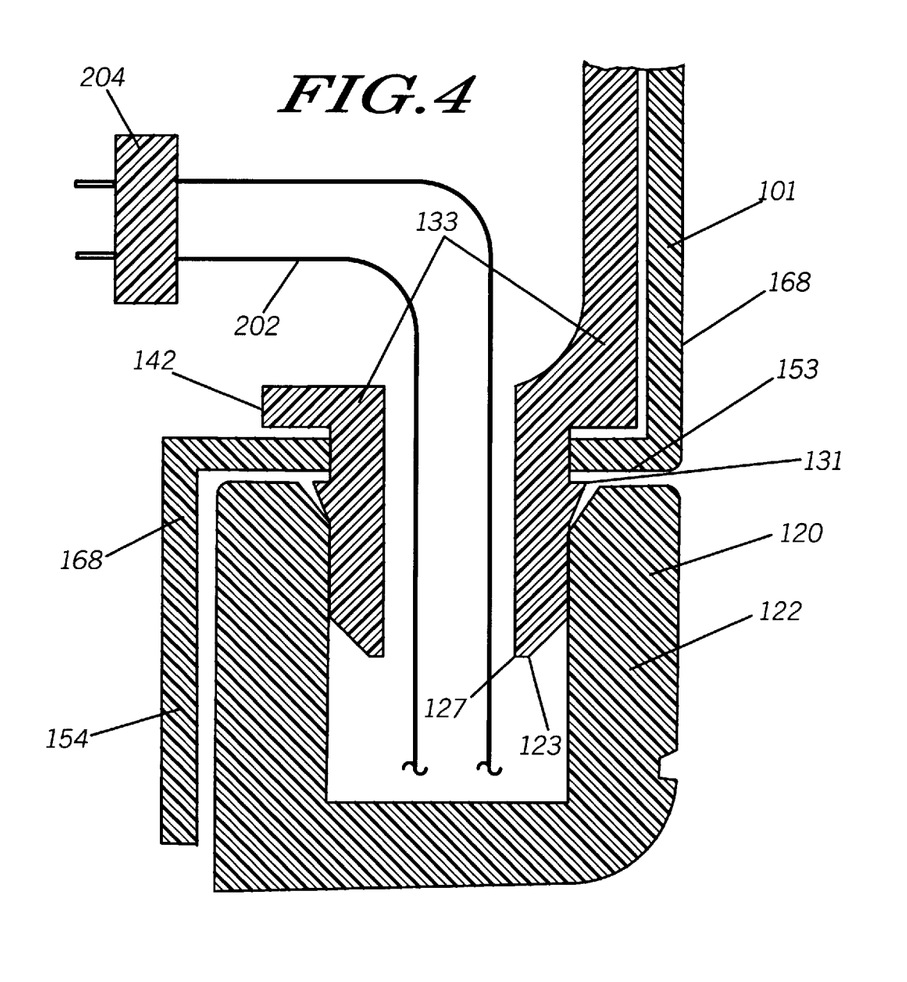
FIG. 4 is a fragmentary cross-sectional view of a communication device incorporating a door cover and hinge assembly, with the hinge pin 133 of FIG. 1 secured, in accordance with the present invention.

As variations of interlocking features with the optional hinge pin leg member 146, the socket 160 of housing 101 of the partially assembled hinge base includes an optional protrusion, shaped like a shelf 302 extending from the socket for mating with a corresponding optional notch 402 on the periphery of the hinge ledge member 142 to receive the protrusion 302.

Optionally, the hinge leg member 146 has an L shape corner end 404 and the socket 160 has a second wall 464 perpendicular to the first wall 164 and the second wall 464 forming the backing of the optional shelf or protrusion 302, wherein the L shape corner end 404 and the second wall 464 pressed together substantially limit the movement of the hinge leg member 146 within the socket 160, with or without the optional shelf 302 and corresponding notch 402 combination further impeding movement.

Another impeding combination exists in the main body portion of the pin 133. Since a portion of the barrel-like body 125 appears to be missing (instead of having a full barrel) to form the side 128, the hinge ledge member looks like a C shape ring with the side 128 of the hinge body member serving as a substantially planar edge for providing the top and bottom ends of the C such that the top and bottom ends of the C and a third wall 162 (perpendicular to the first wall 164 and facing the second wall 464) pressed together substantially limit the movement of the ledge member 142 against the third wall 162.

The pin 133 acts as a plug which mounts inside the cavity 148 and is insertable into the cavity 148 of the sleeve by a slightly collapsible or otherwise resilient slot 141 of the hinge pin 133 through the edge 153, acting as a bore, and positioned by the spacer 146 of the hinge pin 133 within the socket 160. This inventive slot 141 allows the wires 202 already attached to the transducer 206 in the door cover 120 to protrude the wires 202 through the slot 141 while allowing the connector 204 attached to the wires to freely be accessible within the socket 160 and uncovered by the spacer 146.

Operationally, the spacer 146 extending from the side surface of the second hinge member 140, preferably in the shape of an "L", forms a corner for biasing or otherwise pressing against the wall 164 of the socket 160, as an additional aid in securing the second hinge member 133 to the housing socket 160. The spacer as a leg member 146 protrudes from the back of the larger C shaped side wall or ledge 142 to provide redundancy if the snap should fail to hold and also to provide a handle for assembly and disassembly (with an appropriate disassembly tool). Optionally, the integral leg member 146, in the form of the L-shaped spacer, has an open face 147 to capture space for the wires 202 and attached wire connector 204. The backside of the open face 147 is disposed against a higher level frame member or top part of an S-shape housing member 168. This top portion of the S housing member 168 is formed on the underside of an S-shaped hinge cover, frame, foundation or base of the housing 101. The S shaped hinge cover 152 is integrally connected to the main housing such that the L-shaped corner edge 404 of the spacer 146 touches the housing centrally on the underside of this hinge cover. This arrangement creates the socket 160 extending longitudinally along the higher level member 168 of the S-shaped hinge cover 152 such that the socket 160 is accessible through the open face 147 of the spacer 146 for the wire connector 204 to be placed.

The axial placement of the hinge pin 133 through locking the pin 133 to the main housing 101 provides a snap insertion mounting process of the pin 133. In accordance with the invention, the slot 141 provides the resilience within the slot by allowing the separated sides of the slot 141 to be squeezed together by collapsing the sides of the slot so that they may be snapped into place to insert the slotted hinge pin 133 while allowing the slot to expand after insertion to keep the pin in place. Preferably, the pin 133 not only is slotted along its length but also at an angle, allowing the separated sides of the slot 141 to be squeezed together so that they may be snapped into place.

The lengthwise slot 141 allows the wires 202 to be placed through the center of the pin 133 without the need for the attached connector 204 itself to fit through the slot itself. Hence, the wires with the connector attached are routed through the underside of the top center of the housing 101 from the transducer 206 in the door cover for connection to circuitry in the main housing 101, without being externally visible, once the backside or underside of the housing is closed. This hinge pin 133 thus allows electrical connection to be routed through the same hinge mechanism that provides the physical connection on the remaining side of the partially assembled hinge base 105.

Assembly wise, the pin 133 is plugged or inserted into the receiving receptacle of the housing with the slightly smaller barrel end of the pin inserted through a corresponding hub 122 of the door cover (the angled end or annular periphery 127 of the barrel 125 allows a guided and easier insertion process) for the hub 122 to rotate around the pin 133 inserted through the housing 101 to form a snap attachment arrangement which substantially impedes the detachment of the rest of the hinge assembly 130 from the housing 101 after the hinge pin 133 is mounted. However, with a suitable tool, the hinge pin 133 and corresponding hinge assembly can be removed.

The assembly process highlights some of the benefits of the present invention. The door cover 120 mounts within the partially assembled hinge base 105 and is secured by the second hinge member formed by the slotted pin 133. The partially assembled hinge base 105 is formed with the first hinge member 140 whose internal hinge shaft is pressed into a receiving receptacle 152 near the corner 30, through the indentation 165 of the housing 101. A compression spring in combination with a cam and a cam follower mounts within the first hinge member 140 to urge the door cover 120 towards a first rotational position when the rotational angle of the door cover 120 is less than a threshold angle of approximately fifty degrees, and towards a second rotational position when the rotational angle of the door cover 120 is greater than the threshold angle. These angles are measured with respect to the planar front surface of the radio housing 101. The first rotational position is parallel to the front planar surface 115 of the radio housing 101, and corresponds to the closed position of the door cover 120. The second rotational position is a predetermined angle of approximately one hundred and fifty degrees, with respect to the planar front surface 115, and corresponds to the open position of the door cover 120.

To show the interconnection between the pin 133 and the partially assembled hinge base better, the different components of the base is described in more detail, even though they may have been previously described. Capturing the slotted hinge pin 133 and intersecting between the spacer 146 and the larger C shaped end wall ring formed by the ledge 142 of the hinge pin 133 is the S-shaped channel or hinge cover 152 of the housing. This part of the S-shaped hinge cover 152 intersecting the pin 133 is the edge 153 of the receptacle which can be viewed as a bore. This bore 153 accommodates the corresponding circular form of the hub 122 of the door cover 120 when the hub 122 covers the barrel hinge member 125 protruding through the bore 153.

The socket 160, in which the hinge pin 133 is mounted, is integrated within the radio housing 101, and is adjacent to a display above a set of control keys, protruding from key openings 112, which the door cover 120 protects. When viewed from the underside, the socket 160 is a partially open "n" shape or upside-down "J" shaped cavity located along and in between a larger and smaller tube-like sleeve sub-sections of the substantially circular and covered base, frame, channel, guide rails or foundation of the radio housing 101. The raised and correspondingly circular upper side of the housing 101 (viewed from the underside) adjoins the planar front surface 115 of the radio housing 101 at the top of the housing as the recessed inner circular hollow areas or cavities 165 and 148. Thus, the walls 153, 162, 164, and 464 of the socket 160 are formed from the housing 101. Depending on the shape of the hinge pin, any of these socket walls can constitute retaining side walls for the hinge pin 133, such as the end-most wall 153 and optionally, the inner wall 164. The two opposing front and back walls 162 and 164 along the base of the housing further delimit the socket 160 area. The opposed side wall closest the housing edge, forming the edge 153, is centrally open through a center axis to allow the insertion of the inventive slotted hinge pin 133.

As part of the housing 101, the S-shaped frame 152 can also be viewed as portions of integral circular guide rails, in the form of tube-like sleeves. These sleeves are formed integral with and extending away from these opposing side walls 164 and 153 to aid in guiding the hinge assembly of the first 130 and second 133 hinge members into their corresponding receptacles of the guide rails, including the socket 160 during assembly. Recessed inner circular hollow areas or cavities 165 and 148 are located on the front surface of the socket sleeves, when viewing the front of the housing 101, and are designed to accommodate the opposed hubs 122 rotating on the opposed hinge members 140 and 133.

To receive the pin 133, the housing 101 has the substantially S shaped stepped-down frame or channel portion 152 of the sleeve that is integrally formed into the housing 101 as a hinge cover. Depending on the perspective of the viewer, the frame 152 is stepped-up or stepped down. For example, when viewing the housing 101 from the front of the housing, the S shaped frame 152 would appear to be stepped-down. However, when viewing the underside of the same S shaped frame, it would now appear to be stepped-up. At any rate, when viewed from the front of the housing, the S shaped frame portion 152 includes a higher level member 168, a lower level member 154, and an interconnecting joining member or edge 153 between the lower level 154 and higher level 168 members, wherein the underside of the higher level member 168 forms the socket 160, the interconnecting joining member forms the edge 153 of the receiving receptacle for abutting against the rim 129 of the pin 133. The lower level member 154 forms the receiving receptacle or a cavity of a sleeve 148 for receiving the barrel 125 of the pin and this lower level member serves as a channel or rotation track. The indented guide rails of the S-shaped channel 152 and the retaining side walls on the underside of the housing 101, including walls 162, 164, along with the slotted pin 133 together substantially limit the movement of the entire hinge assembly, after the insertion of the hinge pin 133.

At the same time, the upper side of the same lower level member 154 receives the hub 122 of the door cover for the barrel hinge member 125 to fit inside the hub 122 wherein an edge of the hub rotates about the seam-like ridge 131 of the pin for using the barrel 125 as a hinge shaft. The hinge shaft thus formed, rotates within the upper side of the lower level member 154 acting as the rotation track, to rotatably couple the door cover 120 to the pin barrel 125 about an axis of rotation extending through the hinge shaft and the rotation track.

Other electrical circuitry exists within the housing 101 for coupling to the wire connector 204 now accessible in the housing through the open space of the pin's optional leg member 146.

The first hinge member 140 is suitably configured and shaped for attachment at the corner 130. With the first hinge member 140 inserted into a receiving hub at the corner 130, an internal bore formed within the hinge member 140 is secured within the corner 130 by the attachment of the hinge member 140 between the housing 101 and the hub of the door cover 120. Together with the hinge pin 133 to be lastly inserted between the same housing 101 and the hub 122 of the door cover 120 on the opposed corner, the corner 130 and the S-shaped frame 152 of the housing 101 form a rotation track within which the door cover 120 rotates and is locked-in.

The first hinge member 140 includes an integral partial cam shaft having rectangular protruding corners extending from a substantially cylindrical body. The first hinge member 140 is inserted between the hub of the door cover 120 and an inner sidewall of the larger underside tube-like sleeve of the housing 101, at the corner 130. The internal cam interacts with an inner compression spring within the first hinge member 140 to control the rotational resistance of the door cover 120 within the whole hinge assembly.

The door cover 120 is locked onto and as part of the partially hinged or assembled hinge base 105 which also includes the radio housing 101 by inserting the hinge pin 133 along the S-shaped channel 152 of the housing 101 and for securing the slotted hinge pin 133 with the protruding wires 202 and attached connector 204 accessible in the socket 160. The door cover 120 has at least one wire 202 terminated by a wire connector 204 for a transducer 206 disposed in the door cover and having a hub 122 for coupling through the at least one wire 202 and the wire connector 204. Each hub 122 forms the opposed ends for interfacing with the opposed hinge members 140 and 133, bounded by the housing 101 to form a simulated integral hinge shaft formed by separate units, through its central axis, for the door cover 120. Each of the hubs 122 is designed to fit within a rotational indentation or hollowed-out recesses 165 and 148 of the outer surface of the housing 101 and each hub serves to receive the simulated hinge shaft, formed by separate units, including the internal components of the first hinge member 140, rotating in the corresponding simulated rotation track formed by separate units of the rotation track, including the socket 153. The hubs 122 rotate about an axis of rotation extending longitudinally through the center of the hubs 122 and the center of the rotation track in the form of the socket 160.

The pin 133 addresses many of the problems found in the prior art in order to facilitate factory assembly by providing a slotted hinge pin for coupling wires through the slot. Therefore, a door cover hinged assembly made in accordance with the present invention is simpler to assemble.

What is claimed is:

1. A hinged flip assembly for a communication device, the hinge flip assembly comprising:

a partially assembled hinge base having a receiving receptacle, an edge of the receiving receptacle, and a socket having a first wall, the partially assembled hinge base comprising a door cover having at least one wire terminated by a wire connector and having a hub for coupling through the at least one wire and the wire connector;

a transducer disposed in the door cover and connected to the at least one wire for communication with circuitry in the partially assembled hinge base via the wire connector;

a hinge body member having a first opposed surface and a second opposed surface, an aperture extending from the first opposed surface to the second opposed surface, a side adjoining the first and second opposed surfaces and a slot cut into the side extending from the first opposed surface to the second opposed surface; and a hinge ledge member integrally protruding around the periphery of the second opposed surface for allowing the body member, through the slot, to be pressed and snapped into the receiving receptacle of the partially assembled hinge base and the ledge member to plug against the edge of the receiving receptacle of the partially assembled hinge base.

2. The hinged flip assembly of claim 1, wherein the hinge body member comprises:

a barrel having an angled annular periphery at the first opposed surface;

a rim raised from the barrel and integrally connected to the ledge member; and a seam-like ridge raised from the barrel and the rim and integrally connected between the barrel and the rim.

3. The hinged flip assembly of claim 2, wherein the partially assembled hinge base comprises:

a housing having a substantially S shaped stepped-down frame portion including a higher level member, a lower level member, and an interconnecting joining member between the lower level and higher level members, wherein the underside of the higher level member forms the socket, the interconnecting joining member forms the edge of the receiving receptacle for abutting against the rim, the lower level member forms the receiving receptacle for receiving the barrel as a rotation track, and the upper side of the lower level member receives the hub for the barrel to fit inside the hub wherein an edge of the hub rotates about the seam-like ridge for using the barrel as a hinge shaft, the hinge shaft rotating within the upper side of the lower level member as the rotation track to rotatably couple the door cover to the barrel about an axis of rotation extending through the hinge shaft and the rotation track, and the substantially S shaped stepped-down frame portion integrally formed into the housing and having electrical circuitry within the housing for coupling to the wire connector.

4. A hinged flip assembly, comprising:

a door cover having a chamber and a hub for rotating along a hinge mechanism;

a transducer disposed in the chamber;

at least one wire coupling through the hub of the door cover for connecting to the transducer;

a wire connector terminating the at least one wire and the wire connector coupling through the hub;

at least one key opening disposed on the door cover; and at least one actuator protruding through the at least one key opening for actuating a key underneath the hinged flip assembly.

5. The hinged flip assembly of claim 4, further comprising:

a lens on the door cover for displaying a display underneath the hinged flip assembly.

6. The hinged flip assembly of claim 4, further comprising:

a felt pad disposed between the chamber and the transducer for minimizing audio leaks through the chamber.

7. The hinged flip assembly of claim 4, wherein the door cover comprises:

a door chassis having channeling elements to retain the transducer and channel the at least one wire through the hub; and a door lid having an arrangement of apertures for mating with the door chassis.

8. The hinged flip assembly of claim 7 wherein the arrangement of apertures comprises:

a speaker grille for audio porting the transducer retained underneath on the chassis.

9. A hinged flip assembly, comprising:

a transducer having at least one wire terminated by a wire connector;

a door cover having the transducer disposed in the door cover and having a hub for coupling through the at least one wire and the wire connector through the hub;

a body member having a first opposed surface and a second opposed surface, an aperture extending from the first opposed surface to the second opposed surface, a side adjoining the first and second opposed surfaces and a slot cut into the side extending from the first opposed surface to the second opposed surface for allowing the at least one electrical wire terminated by the wire connector to slip through the slot and into the aperture before plugging the body member into a first receptacle;

a ledge member protruding around the periphery of the second opposed surface; and a leg member extending from the second opposed surface at the ledge member for mounting the leg member within a second receptacle for locating the wire connector.

* * * * *